Nov. 20, 1956  L. J. SHARER  2,770,907
FISHING POLE SIGNAL ATTACHMENT
Filed June 30, 1952
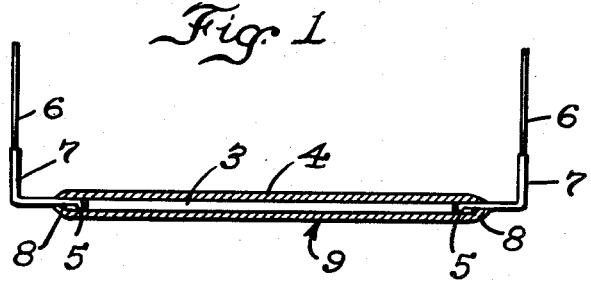
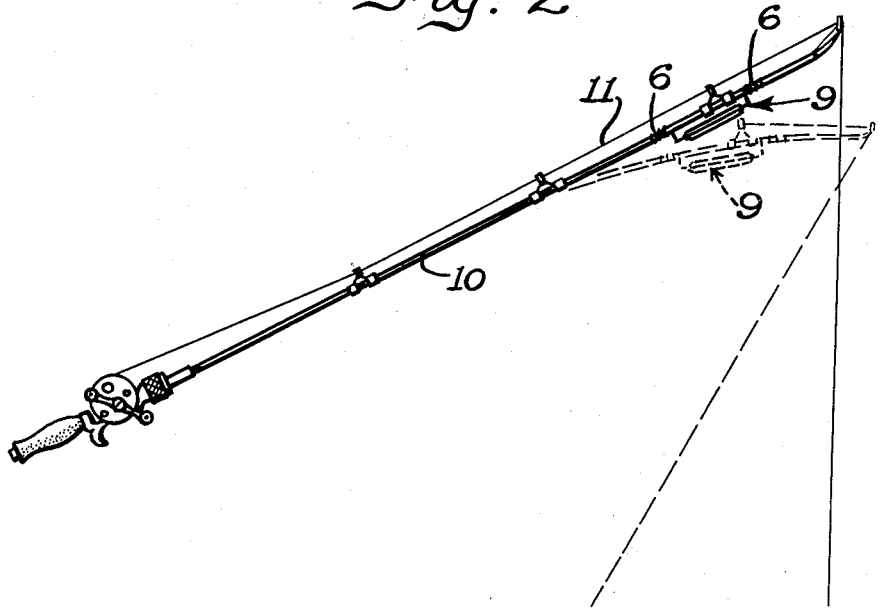
Inventor
Lawrence J. Sharer

United States Patent Office 2,770,907
Patented Nov. 20, 1956

2,770,907

FISHING POLE SIGNAL ATTACHMENT

Lawrence J. Sharer, Davis, Ill.

Application June 30, 1952, Serial No. 296,404

4 Claims. (Cl. 43—17)

This invention relates to a new and improved fishing pole signal attachment designed to clearly indicate to the fisherman in night fishing when there is a fish on the line.

I am aware that electrical signal lights have been provided, but they are objectionable because of the uncertainty of operation and the need for replacing the batteries at intervals, not to mention the matter of high cost, considering the dubious service rendered by such attachments. It is therefore the principal object of my invention to provide a signal attachment that involves no no moving parts and requires no batteries, the same consisting of a luminous rod element suitably encased in a protective tube of transparent material, both of suitable length, and having means at the opposite ends thereof for easy attachment to any fish pole near the outer end thereof on the under side away from the line, where it will not interfere with the line and yet will be clearly visible at all times to give a warning signal when the fish bites, by reason of the movement of the luminous element up and down with the pole with the tugging on the line.

I prefer to use for the luminous rod element a piece of porous wood covered with luminous paint, and for the protective, transparent tubing surrounding the rod, a tube of Plexiglas, the latter being sufficiently durable and being also thermoplastic so that it lends itself to easy anchoring in the ends thereof of the attaching wires. Pieces of insulation are preferably provided on the inner ends of the wires so as to seal the ends of the tube when the ends are closed on the wires under heat and pressure.

The invention is illustrated in the accompanying drawing, in which—

Fig. 1 is a view substantially full size of my improved fishing pole signal attachment, and Fig. 2 is a side view of a fishing pole with the attachment applied thereto, and indicating in dotted lines the mode of operation.

The same reference numerals are applied to corresponding parts in these two views.

Referring to the drawing, the reference numeral 3 designates the piece of porous wood coated with luminous paint of the well-known kind that glows in the dark. The luminous element 3 is encased in a tube 4 of Plexiglas or the like, which serves as the protective receptacle for the luminous element and is transparent, and therefore permits the light given off by the luminous element 3 to be easily seen at the distance necessary for a fishing pole attachment where the attachment is applied to the outer end of the pole as herein disclosed. Plexiglas is also desirable because of its durability and its property of being thermoplastic, which permits easily anchoring in the ends thereof the double ends 5 of wires 6 intended for use in attaching the signal device to the fishing pole. On the inner ends of the wires 6 are pieces of insulation, indicated at 7, which in relation to the wires are relatively soft and compressible and serve to seal the ends of the tube 4 when they are closed on the wires under heat and pressure, as indicated at 8. The device lasts indefinitely because the luminous paint has the property of absorbing light and glowing in the dark, and so long as the luminous element 3 is protected in the manner described, there is no danger of the luminous paint being scratched off or wearing off even with rough handling of the fishing pole.

As shown in Fig. 2, the attachment indicated generally by the reference numeral 9 is attached to the pole 10 on the under side away from the line 11 near the outer end of the pole, by winding the wires 6 around the pole. If desired, a piece of tape may be also wrapped around the wire to minimize likelihood of the wire unwrapping.

In operation, the signal attachment, because of the length of the luminous element 3, is always easily visible to the fisherman and he need only watch this light in order to know when to go into action to land a fish when one is caught, because when that occurs the tugging on the line will cause the light to bob up and down with the flexing of the pole.

It is believed the foregoing description conveys a good understanding of the objects and advantages of my invention. The appended claims have been drawn to cover all legitimate modifications and adaptations.

I claim:

1. A fishing pole or rod signal attachment comprising, in combination in an assembly, an elongated rod-like element that is luminous in the dark, a tubular transparent protective covering thereon that extends beyond both ends thereof, and a pair of easily bendable, non-springy wires anchored by their one ends in the opposite ends of the tubular covering next to the end of the luminous rod and extending therefrom and being of appreciable length to wind several turns around the small outer end portion of said fishing pole or rod to fasten the attachment by its ends to said pole or rod in closely spaced parallel relationship thereto.

2. A fishing pole or rod signal attachment comprising, in combination in an assembly, an elongated rod-like element that is luminous in the dark, a tubular transparent protective covering thereon that extends beyond both ends thereof, and a pair of easily bendable, non-springy wires having end portions with relatively soft coverings which are entered in the opposite ends of the tubular covering, the latter ends being closed tightly upon said soft coverings whereby to anchor the wires securely and also seal said tubular covering by compression of the soft coverings on the wires, said wires extending from said tubular covering and being of appreciable length to wind several turns around the small outer end portion of said fishing pole or rod to fasten the attachment by its ends to said pole or rod in closely spaced parallel relationship thereto.

3. A signal attachment for a fishing pole or rod comprising in combination with the small diameter, easily flexible outer end portion of said pole or rod, of an elongated rigid signal element that is luminous all over disposed in closely spaced substantially parallel relationship to said end portion and having fixed to its opposite ends a pair of flexible, easily bendable, non-springy wires of appreciable length wound several turns around said end portion fastening the element securely thereto but with freedom for said end portion to arch with respect to said luminous signal element by virtue of the flexibility of said wires.

4. A fishing pole or rod signal attachment comprising, in combination in an assembly, an elongated rod-like element that is luminous in the dark, a tubular transparent protective receptacle that encloses the luminous rod and extends beyond both ends thereof, said tubular receptacle being of thermoplastic material, and a pair of easily bendable, non-springy wires having end portions entered in the opposite ends of the tubular receptacle adjacent the ends of the luminous rod for anchorage, the end portions of said wires being folded to double thickness to provide shoulders on which to anchor the ends of said tubular receptacle and the end portions of said thermoplastic tubular receptacle being closed upon said wires by application of heat and pressure for retaining abutment with these shoulders, said wires extending from said tubular receptacle and being of appreciable length to wind several turns around the small outer end portion of said fishing pole or rod to fasten the attachment by its ends to said pole or rod in closely spaced parallel relationship thereto.

References Cited in the file of this patent

UNITED STATES PATENTS

| | | |
|---|---|---|
| 1,410,741 | Erdle | Mar. 28, 1922 |
| 1,833,241 | Wright | Nov. 24, 1931 |
| 2,196,784 | Simmons et al. | Apr. 9, 1940 |
| 2,302,337 | Mantell | Nov. 17, 1942 |
| 2,576,045 | Robinson et al. | Nov. 20, 1951 |
| 2,641,079 | Oster | June 9, 1953 |

OTHER REFERENCES

Plastics That Glow in the Dark, from Modern Plastics, October 1948, pgs. 88–91.